United States Patent [19]
Shute et al.

[11] 3,893,330
[45] July 8, 1975

[54] SURFACE FRICTION TESTING

[75] Inventors: George A. Shute; Richard A. Zimmer, both of College Station, Tex.

[73] Assignee: Data Systems, Inc.

[22] Filed: Jan. 7, 1974

[21] Appl. No.: 431,358

Related U.S. Application Data

[63] Continuation-in-part of Ser. No. 316,369, Dec. 18, 1972, abandoned.

[52] U.S. Cl. ................................ 73/9; 73/146
[51] Int. Cl. ..................................... G01n 19/02
[58] Field of Search ............... 73/9, 146, 126, 128; 324/174, 173

[56] References Cited
UNITED STATES PATENTS

| | | | |
|---|---|---|---|
| 2,192,602 | 3/1940 | Meshberg | 73/128 |
| 2,279,409 | 4/1942 | Milster et al. | 73/128 |
| 2,370,141 | 2/1945 | Brunner | 73/128 |
| 3,406,775 | 10/1968 | Magnuski | 324/174 |

*Primary Examiner*—Donald O. Woodiel
*Attorney, Agent, or Firm*—Pravel & Wilson

[57] ABSTRACT

An apparatus for measuring speeds and distances to determine the coefficients of friction between a tire of a braked vehicle wheel and a road surface. A speed unit and distance units are provided to measure the speed and distances for alternately determining the coefficient of friction as a function of percent slip, the stopping coefficient of friction, and the skidding coefficient of friction.

14 Claims, 8 Drawing Figures

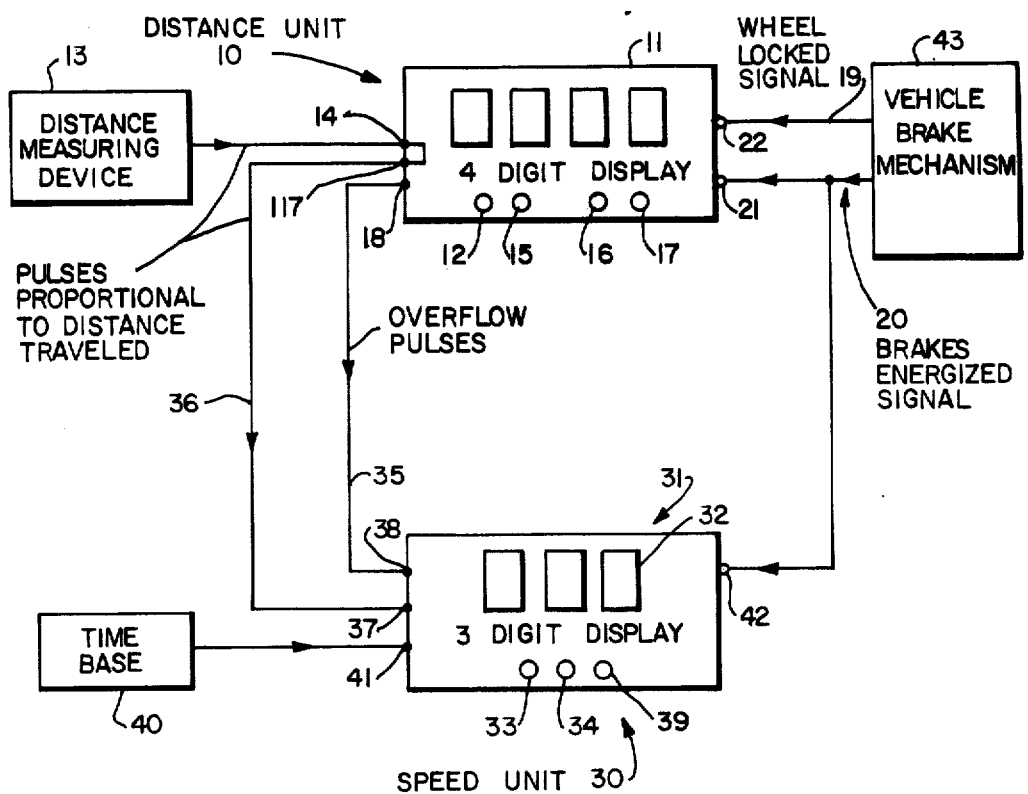
FIG. 1
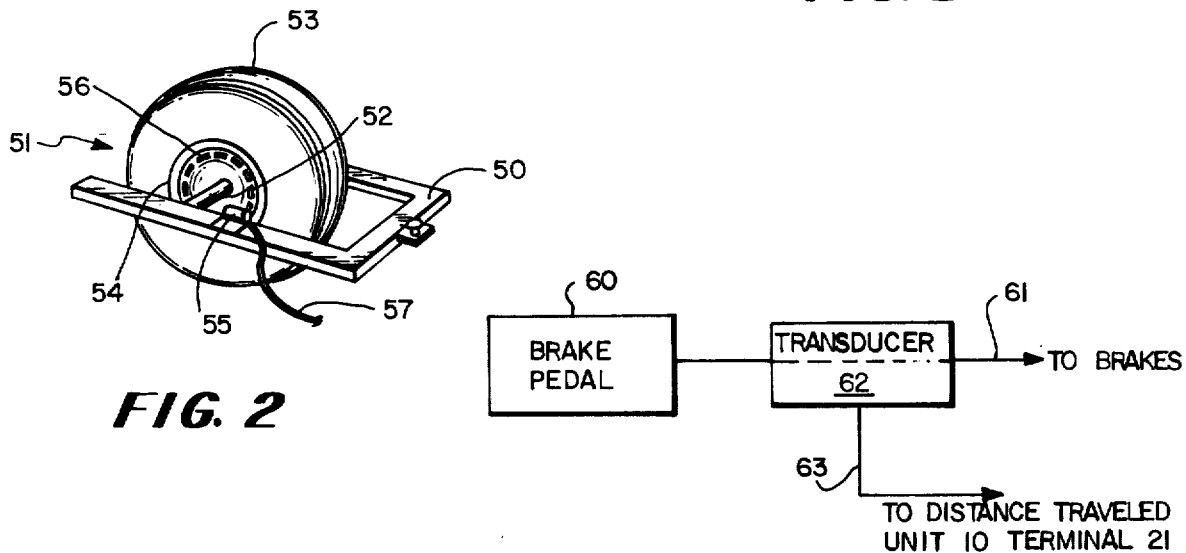
FIG. 2
FIG. 3
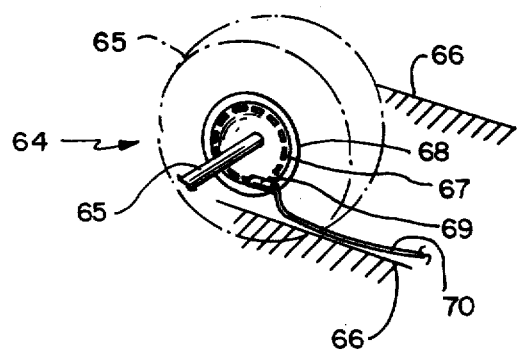
FIG. 4

SURFACE FRICTION TESTING

CROSS REFERENCE TO RELATED APPLICATION

This application is a continuation-in-part of our U.S. patent application, Ser. No. 316,369 filed Dec. 18, 1972, now abandoned.

BACKGROUND OF THE INVENTION

Increasing requirements for high speed transportation have created a demand for dependable ways to measure surface friction of roadways and vehicle tires. That demand has become more critical with recognition of the need to increase highway safety for vehicular traffic on roadways of all kinds.

Some known devices for determining surface friction depended upon development of a force, typically torque, resulting from engagement of a tire of a braked wheel with the roadway surface during movement of the vehicle as an indication of surface friction. Such approaches were not satisfactory for a number of reasons, including the fact that the torque or other force was at best only indirectly related to the friction characteristics of the surfaces involved. Other known devices tested roadway and tire surface friction by determining the "stopping distance number" or stopping coefficient of friction. Typically, such a determination was made by applying the brakes when the vehicle was travelling the roadway, marking the roadway beneath the vehicle when the brakes were engaged, and measuring the distance from the mark to the point on the roadway at which the vehicle came to rest. Such devices were relatively cumbersome and could yield imprecise information.

SUMMARY OF THE INVENTION

With a first embodiment of the present invention, precise measurements are made of both the speed of a vehicle at the time of brake engagement and the distance travelled by the vehicle after brake engagement. Thus, the total stopping distance of the vehicle as well as vehicle speed and distance are measured from which accurate determinations of the stopping coefficient of friction can be made.

Alternatively, the first embodiment of the present invention measures the speed of the vehicle at the time of brake engagement and the distance travelled by the vehicle after the braked wheel locks. From these measurements of speed and distance, the skidding coefficient of friction can be determined according to the equation:

$$\mu_s = \frac{S^2}{KD}$$

where $\mu_s$ is the skidding coefficient of friction at the tire and roadway interface, $S$ is the speed of the vehicle at the time of brake engagement, $D$ is the distance travelled by the vehicle after the braked wheel locks, and $K$ is a constant depending upon the number of wheels locked and skidding.

The first embodiment includes an apparatus, such as a fifth wheel device, for generating a first pulsed signal having pulses proportional in number to the distance travelled by the vehicle, and a means for generating a second pulsed signal having pulses proportional in number to the rotation of the braked wheel. A first and a second counter are also provided to count and display the number of pulses in the first pulsed signal during various intervals. When the total stopping distance of the vehicle is measured, the first counter counts and displays the number of pulses in the first pulsed signal subsequent to the time of brake engagement. When distance and speed for determining the stopping coefficient of friction are measured, the first counter counts and displays the number of pulses in the first signal subsequent to the time of brake engagement, and the second counter counts and displays the number of pulses in the first signal during a known, but short time period immediately after brake engagement to yield the stopping distance of the vehicle and the speed of the vehicle at the time of brake engagement. Further, when distance and speed are measured for determining the skidding coefficient of friction, the first counter counts and displays the number of pulses in the first signal after two events occur: the brakes are engaged and the braked wheel stops rotating, as indicated by no pulses being present in the second signal. The second counter counts and displays the number of pulses in the first signal during a known, but short time immediately after brake engagement. Hence, the distance travelled by the vehicle after the braked wheel locks and the speed of the vehicle at the time of brake engagement are measured.

A second embodiment of the present invention measures speed and distance for determining the coefficient of friction as a function of percent slip. In addition to the signal generating means and counters of the first embodiment, the second embodiment includes a third counter to count and display the number of pulses in the second signal subsequent to brake engagement. The display of the third counter is proportional to the horizontal distance of rotation of the braked wheel. Thus, when the first counter measures the stopping distance of the vehicle and the third counter measures the horizontal distance of rotation of the braked wheel, the percent slip of the braked wheel may be determined. Further, the speed of the vehicle at the time of brake engagement is obtainable from the second counter so that the coefficient of friction $\mu$ may be calculated.

By determining $\mu$ for a number of values of percent slip, a graph of $\mu$ as a function of percent may be derived. Derivation of such a graph yields an easily interpretable display of the frictional characteristics of the road under a wide variety of braking conditions which are likely to occur during normal use of the road.

BRIEF DESCRIPTION OF THE DRAWINGS

FIG. 1 is a block diagram illustrating apparatus for practicing the method of this invention;

FIG. 2 is a diagrammatic perspective view of a fifth wheel type distance measurer useful in the apparatus;

FIG. 3 is a block diagram illustrating typical means useful in the apparatus for providing a signal in response to application of the test vehicle brakes;

FIG. 4 is a diagrammatic perspective view of a braked wheel of the test vehicle equipped with means for generating a pulse signal so long as the wheel rotates;

DETAILED DESCRIPTION OF THE PREFERRED EMBODIMENTS

General Description

Figure 5:
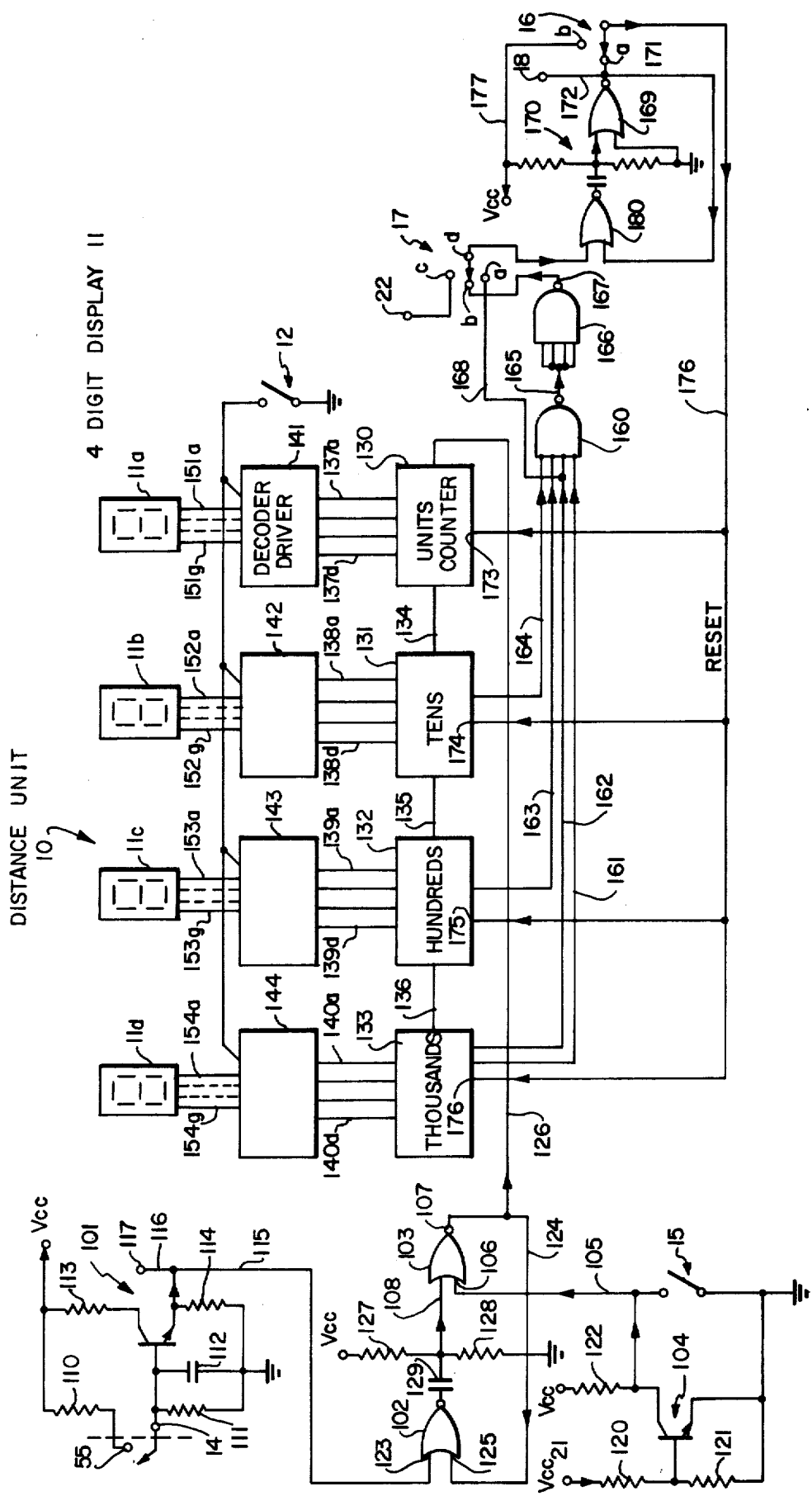
FIG. 5 is a schematic diagram of a distance unit forming part of the apparatus shown in FIG. 1.

FIG. 1 shows an apparatus A, according to one embodiment of the present invention for measuring speed and distance to alternatively determine the total stopping distance of a vehicle, the stopping coefficient of friction, and the skidding coefficient of friction.

A distance measuring device 13 generates a first pulsed signal having pulses whose numerical quantity is proportional to the distance travelled by a vehicle. A vehicle brake mechanism 43 generates a brake energized signal having a substantially constant magnitude initiated at the time a braking force is applied to the vehicle wheel and a second pulsed signal, a wheel locked signal, having pulses whose numerical quantity is proportional to the rotation of the braked wheel. A time base unit 40 generates a signal having pulses of a specified time duration. A distance unit 10 and a speed unit 30 are both electronic registers known as events counters having displays 11 and 31, respectively.

The counts displayed by the distance unit 10 and the speed unit 30 are determined by the signals generated by the distance measuring device 13, the vehicle brake mechanism 43, and the time base 40. As will be set forth below when the total stopping distance of a vehicle is determined, the pulses of the first pulsed signal of distance measuring device 13 are counted by distance unit 10 and speed unit 30. When the stopping coefficient of friction is determined, the pulses of the signal from the distance measuring device 13 are counted by distance unit 10 beginning at the time when the brakes energized signal from the vehicle brake mechanism 43 is initiated. Thus, the distance unit 10 displays the distance travelled by the vehicle after brake engagement. In addition, speed unit 30 counts the pulses of the first signal from distance measuring device 13 occurring during the duration of a pulse in the signal from time base 40 and immediately subsequent to the initiation of the brakes energized signal from the vehicle brake mechanism 43. As a result, the speed unit 30 displays the speed of the vehicle substantially at the time of brake engagement.

As will be set forth below when the skidding coefficient of friction is determined, speed unit 30 again displays the speed of the vehicle substantially at the time of brake engagement, but distance unit 10 is connected so that the count displayed thereby is the distance travelled by the vehicle after the braked vehicle wheel ceases to rotate. Pulses in the wheel locked signal from vehicle brake mechanism 43 are used to reset the count of distance unit 10 to zero as long as the braked wheel continues to rotate.

Distance Measuring Device 13

The distance measuring device 13 generates pulses whose numerical quantity is proportional to the distance travelled by the vehicle. The pulses are supplied to distance unit 10 at a terminal 14 by a conductor 14a and to speed unit 30 at a terminal 37 by a conductor 36.

The pulses are obtained from a device 51 (FIG. 2) known as a fifth wheel. A frame 50 supports wheel 51 for rotation about an axle 52. A tire 53 is mounted with a hub 54 of wheel 51. A plurality of magnets 56 are equally spaced about and mounted with hub 54 to rotate therewith, and a stationary reed switch 55 is mounted on frame 50 so that switch 55 is sequentially actuated by the magnets 56 as wheel 51 rotates. A voltage from the distance unit 10 is supplied through a cable 57 in series with switch 55, thus producing voltage output pulses whose numerical quantity represents the distance travelled by the vehicle.

The diameter, and therefore the circumference, of the wheel 51, together with the number of magnets 56 located on the hub 54 of the wheel 51, are chosen to provide a convenient calibration of pulses per unit distance. Pulses from the distance measuring assembly 13 so calibrated one applied via conductors 57 and 14a to terminal 14 of distance unit 10. With a count on-off switch 15 of distance unit 10 in the on position, the display 11 of distance unit 10 displays a number equal to the total distance travelled.

Braked Wheel Mechanism of FIGS. 3 and 4

FIG. 3 is a simplified functional diagram of the brake mechanism 43 in FIG. 1 which generates the wheel locked signal and the brake energized signal. FIG. 3 shows a brake pedal 60 connected to the brakes through a hydraulic or mechanical line 61. A transducer 62 converts the increase in hydraulic pressure in the line 61 during application of the brakes to an electrical signal which is applied through a conductor 63 to a terminal 21 of the distance unit 10 via a conductor 20 and to a terminal 42 of the speed unit 30 via a conductor 20a.

FIG. 4 shows the relative location of the components which generate the wheel locked signal. A wheel 64 is one of the wheels of the vehicle which may be locked by operation of the brake pedal 60 of FIG. 3. Wheel 64 is mounted for rotation on an axle 65 which in turn is carried by a vehicle frame 66. Mounted on wheel 64 is a tire 65a. A plurality of permanent magnets 67 are mounted on a hub 68 of wheel 64. In order to maintain the accuracy of the distance measurement, the number of permanent magnets 67 mounted on the hub 68 is made greater than the number of permanent magnets 56 used in the distance measuring unit 13. The magnets 67 are positioned so that they cooperate with a reed switch 69 mounted on frame 66. As the wheel 64 rotates, the flux of each of the magnets 67 causes the switch 69 to close. A voltage and signal return path are supplied to switch 69 through conductor 70 connected to the conductor 19 (FIG. 1). As the reed switch 69 closes under the influence of the flux from each permanent magnets 67, a pulse is generated which is applied to a terminal 22 of the distance unit 10 through conductors 70 and 19.

Detailed Description of Distance Unit 10

FIG. 5 is a schematic diagram of the distance unit shown generally at 10, FIG. 1. In addition to the major circuits and functional blocks, FIG. 5 shows signal flow and the various digital logic interconnections. In regard to input and output terminals, switch controls and input and output signals, the reference numerals of FIG. 5 are the same as those used in FIG. 1.

The distance unit 10 is an electronic register known as an events counter having a 4-digit display 11 to count up to a total of 9999 events. Each display digit is the seven segment type. A test switch 12 is connected to permit display of all segments of all four digits at the same time, verifying that they are operating correctly. With the test switch closed, the unit will display the number 8888 because the numeral 8 employs all seven elements of the seven segment displays.

A calibrate switch 17 is provided to select a specific predetermined count which is electronically set into the distance unit 10. For example, if the calibrate switch 17 is set to the number 5280, an overflow pulse will be provided at an overflow terminal 18 when the count equals 5280, thus indicating that the distance travelled is exactly one mile. Other numbers may be electronically preset into the unit. These output pulses, termed overflow pulses, are supplied to a speed unit 30 by conductor 35.

Pulses generated by the distance measuring device 13 with a count proportional to the distance travelled are applied to input terminal 14 of the distance unit 10. The pulses are processed by a transistor 101 and are gated on and off by Nor gates 102 and 103. The Nor gates, in addition to their gating function, coact to shape the distance pulses.

The brake energization signal produced by the vehicle brake mechanism 43, which was described in relation to FIGS. 1 and 3, is applied to a terminal 21 of the distance unit 10. A transistor 104 inverts the signal applied at terminal 21. Thus, when a positive voltage is applied to terminal 21, transistor 104 conducts, reducing the potential at a colletor 104a, thereby producing a logic zero at path 105 and input 106 to gate 103. With a voltage applied to terminal 21, and the signal at terminal 106 of gate 103 in a logic zero condition, an output signal will be obtained at a terminal 107 of gate 103 coincident with logic zeros applied to terminal 108 of gate 103 which are available when distance pulses are applied to terminal 14.

Switch 55 (FIG. 2) is series connected via a resistor 110 to a source of positive voltage. The other terminal of switch 55 is connected by way of terminal 14 to the base of transistor 101. A resistor 111 and capacitor 112 are connected between a base 101a of the transistor 101 and ground. These components reduce transient and high frequency noise generated by switch 55 and associated components. Transistor 101, with a collector resistor 113 connected to a source of positive voltage and an emitter resistor 114 connected to ground, functions essentially as an emitter-follower. Input signals applied to the base 101a of the transistor 101 are reproduced at an emitter 101b connection with the same polarity and with an amplitude determined by the values of resistors 113 and 114. The output of transistor 101 is connected by a path 115 to one input gate 102 and to a terminal 117 via a path 116. Terminal 117 connects the distance pulses to the speed unit 30.

The brake engagement signal obtained from the vehicle brake mechanism 43 via conductor 63 is applied to terminal 21 of distance unit 10. When the vehicle brakes are energized, a positive voltage is applied through a current limiting resistor 120 to the base 104b of transistor 104 and via a resistor 121 to ground. The positive voltage applied to base 104b of transistor 104 causes it to conduct, causing current to flow through a collector 122 which is connected to a source of positive potential. With the brakes energized and transistor 104 conducting, a logic zero is applied through path 105 to a first input 106 of gate 103. With switch 55 of the distance measuring device open, a logic zero is applied to the first input 123 of gate 102. The inverter action of gate 102 causes a logic 1 to be applied to the second input 108 of gate 103. With input 108 at logic 1 and input 106 a logic zero as a result of energizing the brakes, the output 107 of gate 103 is a logic zero. A feedback path 124 connects the logic zero from output terminal 107 of gate 103 to input terminal 125 of gate 102. The combination of a logic zero from gate 103 plus the logic zero at terminal 123 when switch 55 is open results in the logic 1 at the output of gate 102 and therefore the input terminal 108 of gate 103. At the instant when switch 55 is closed, however, a logic 1 is applied via path 115 to input 123 of gate 102, thus causing the output to be a logic zero. Thus, gate 103 has logic zeros at both input terminals 106 and 108, causing a logic 1 to be generated on path 124 for feedback to gate 102 and also on path 126 for application to a units counter 130.

As previously stated, closing switch 55 produces pulses with a numerical count proportional to the distance travelled. However, as the vehicle's speed changes the pulse width or time duration of the distance pulses changes. Nor gates 102 and 103 in addition to their gating function serve to correct this variation in pulse width. The resistive and capacitive network of a resistor 127, a resistor 128, and a capacitor 129 in conjunction with the feedback path 124 produce pulses at the output of gate 103 on paths 124 and 126 with substantially uniform pulse widths. The circuit comprising the two gates and the networks is one suitable type of monostable multivibrator.

Thus, in the operation of the input circuits of the distant unit 10, closing of switch 55 generates positive pulses which are applied to the units counter 130 for counting when a positive voltage obtained from the brake energization is applied to terminal 21.

A count on-off switch 15 will perform the same function as applying a positive signal to terminal 21. Closing switch 15 produces a logic zero at terminal 106 of gate 103, thus permitting the passage of distance signals, obtained by closing of switch 55, to the input terminal of the counter 130.

Counters 130, 131, 132 and 133 are conventional decade or scale of 10 binary counters. Each counter comprises four individual bistable multivibrators interconnected to count nine input pulses and produce an output or overflow pulse upon receipt of the tenth pulse. The overflow pulses from the units, tens and hundreds counters are connected to the next following counter via paths 134, 135 and 136, respectively. The binary output of the units, tens, hundreds and thousands counters are available on paths 137A–D, 138A–D, 139A–D, and 140A–D. The output signals on paths 137–140, usually referred to as BCD (binary coded decimal), are applied to the decoder driver units 141–144, respectively.

The decoder drivers 141–144 provide two basic functions. First, the decoder drivers convert the BCD input signals to seven segment output signals on paths 151–A–G, 152A–G, 153A–G, and 154A–G, respectively. For example, if the units counter 130 receives eight input pulses, a signal is produced on the BCD output lines 137A–D indicating a count of eight, while the output lines 151A–G energize all segments of the seven segment display 11A which will then display the numeral eight. The second function of the decoder drivers is to provide seven segment signals of the proper voltage and current magnitudes to properly energize the seven segment displays. The other counters, decoder/drivers, and displays operate in the same manner.

Apparatus A illustrated in FIG. 1 is adaptable for measuring the total stopping distance of the vehicle. Calibration of the circuitry of distance unit 10 and speed unit 30 permits the speed unit 30 to measure and display the number of miles travelled and the distance unit 10 to display any additional fraction of a mile travelled. When properly calibrated, the display of the distance unit 10 will then represent the number of feet travelled.

For example, when speed unit 39 is calibrated to measure and display the miles travelled and distance unit 10 measures fractional miles in feet, calibration switch 17 is placed in the b position illustrated in FIG. 5.

The four-input Nand gate 160 produces a logic zero at the output path 165 when all four inputs are logic ones. Inputs A and B of Nand gate 160 are logic ones, obtained from the thousands counter 133 via paths 161 and 162, when the counter registers the numeral five. The hundreds counter 132 transmits a logic one via path 163 to input terminal C of Nand gate 160 at the time the hundreds counter registers a numeral 2. In a similar manner, a logic 1 is transmitted from the tens counter 131 via path 164 to input terminal D of Nand gate 160 when the tens counter registers the numeral 8. Thus, all four inputs to the Nand gate 160 are at logic 1 and a logic zero is produced on output path 165 when the counters register the number 5280.

This overflow pulse on path 165 is applied to all four inputs of Nand gate 166 which in turn generates an inverted or logic 1 at the output path 167 which is connected to terminal b of the switch 17.

In a similar manner, an overflow pulse can be generated when the counters reach a count of 1000. This signal is obtained via path 162, and since the thousand signal represents a single output, the Nand gates 160 and 166 are dispensed with. This output signal then is applied via path 168 to terminal a of the calibration switch 17.

Gates 180 and 169 and the associated an RC network indicated generally at 170 perform in an identical manner to the gates 102 and 103 and their associated RC network. However, one input of gate 169 is grounded, and therefore coincidence between the two input signals to this gate is not required to produce a logic one output, but rather the single function of the gates is to improve and produce a uniform pulse width at the output terminal 171.

Figure 6:
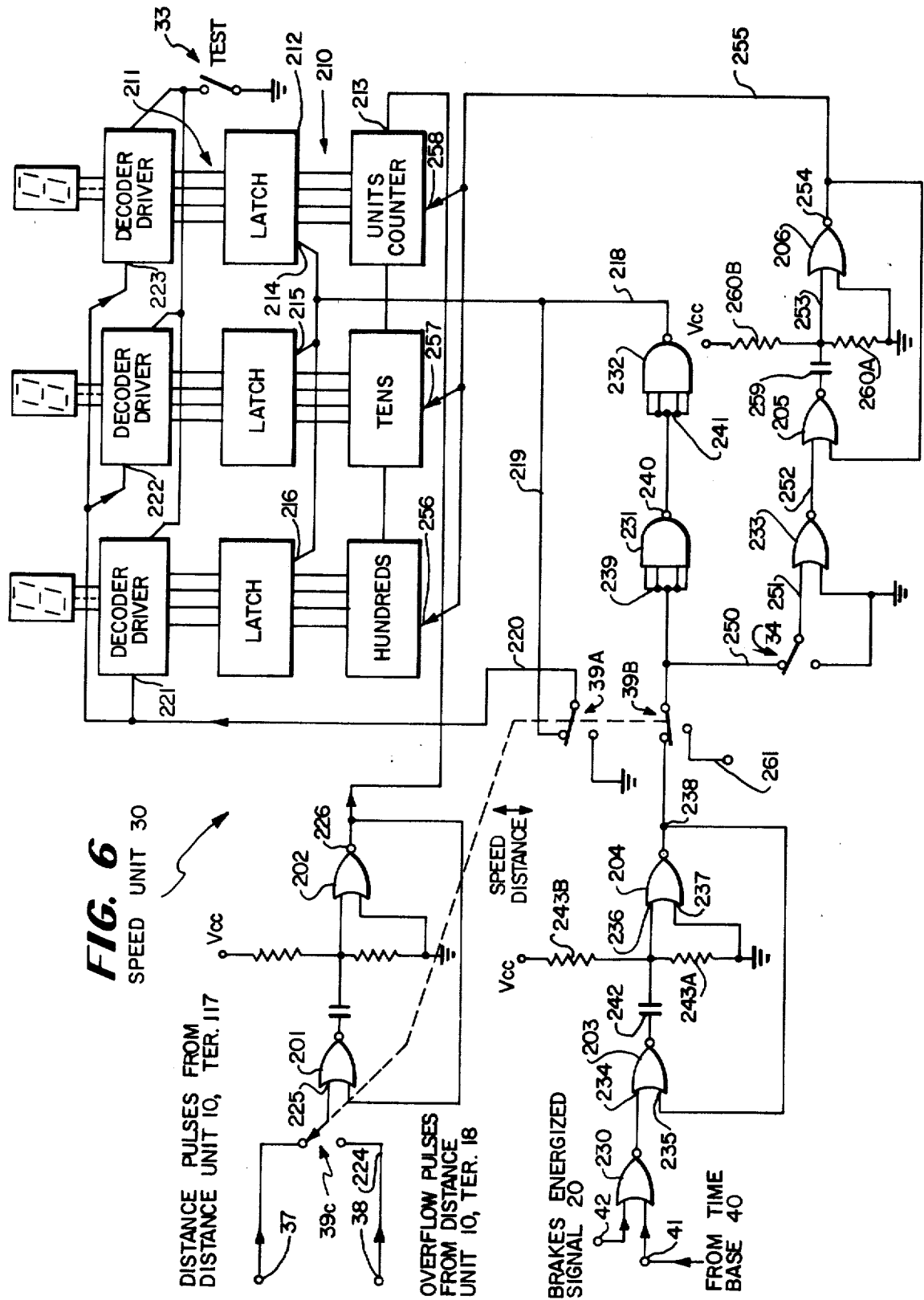
FIG. 6 is a schematic diagram of a speed unit forming part of the apparatus shown in FIG. 1.

An overflow pulse produced at terminals a or b of switch 17 causes a pulse to be produced at the output of gate 169 and hence at a terminal 18 of distance unit 10. Terminal 18 of unit 10 is connected to a terminal 38 of speed unit 30. When a speed/distance switch 39 of unit 30 is in the speed position, the overflow pulse will be counted by counters 213 of unit 30 (FIG. 6).

When switch 17 is in position c, the wheel locked signal is applied through gates 180 and 169 via switch 16 to the reset terminals of all four counters to zero. Thus, when making skidding distance measurements, the wheel locked signal causes the distance counters 130–133 to be reset to zero unit the braked wheel 64 becomes fully locked, at which time the counters 130–133 commence counting pulses proportional to the skid distance.

Detailed Description of Speed Unit 30

The speed unit 30 consists of a number of electronic counters 213 and a 3-digit display assembly 31. The display assembly 31 comprises three 7-segment displays 32 for counting up to 999 pulses. A test switch 33 causes all 7segments of the 7-segment displays to be illuminated displaying the number 888, thus testing the counter and display portions of the speed unit 30. A manual reset switch 34 permits resetting counters 213 and the 7-segment displays to zero at any time.

The speed unit 30 (FIG. 6) is similar to the distance unit of FIG. 5 in that both units employ Nand and Nor gates, counters, decorder/drivers, and seven segment displays. The Nor gate pairs made up of gates 201 and 202, 203 and 204, and 205 and 206 are identical in their interconnections to the gate pair made up of Nor gates 180 and 169 (FIG. 5) with the exception of the input and output circuits.

A counter chain 30a is made up of counters 213, decoder/drivers 221–225, and seven segment displays 31 having a latch circuits 212 inserted between the respective counters and decoder/drivers. The function of the latch circuits 212 is to hold the information contained in the respective counters when a command signal is given, but without changing the form of the signal contained in the counter. The outputs of the counter circuits in the form of BCD signals on conductors 210 remain in the form of BCD signals at the outputs of the latch circuits on paths 211.

The counters, latches and decoder/drivers of the speed unit operate as follows. With a string of distance pulses applied continuously over a brief period of time, the output BCD signals of counters 213 will be continuously changing as the units counter 213a proceeds with the count. If these same BCD signals were applied to the input of the decorder/driver and further to the seven segment displays 31, displays 31 would continue to change the displayed numeral. Latch circuits 212, however, function to hold the count in the counters at that particular instant of time when the latch is so commanded. A command signal applied to a terminal 214 of latch circuit 212 causes it to register and hold the count in the counters 213 until the time when the command signal is released. For example, if the units and tens counter 213a and 213b of the speed unit of FIG. 6 proceeded to a count of 60 at that instant when a command signal is received at terminals 214 and 215 of the units and tens counters respectively, the numerals 60 are displayed on the associated seven segment displays.

The command signal is produced by a Nand gate 232 and transferred on a path 218. The signal also functions to blank and unblank the seven segment displays 31. At the instant the command signal instructs the latch circuits 212 to register the count held in the counter circuits 213, the command signal also travels by way of a path 219, a speed distant switch shown generally as 39A, a path 220 and finally to terminals 221, 222 and 223 of the decoder/driver circuits. Through the driver circuits the seven segment displays are blanked at the instant the command signal instructs the latch circuits to hold the count, removal of the command signal illuminates the seven segment displays through the driver circuit.

The units, tens, and hundreds counters 213 are interconnected to count distance pulses received from the distance measuring device 13 applied to a terminal 37 of the speed unit. Alternatively with switch 39c connected to a terminal 38, via a conductor 224, speed unit 30 counts overflow pulses from the distance unit 10 will be obtained via terminal 38. In either case, when the signal applied to a terminal 225 of a Nor gate 201 goes from a logic 0 to a 1, the output of a Nor gate 202 on a terminal 226 will go from a logic 0 to 1. Positive pulses of non-uniform width received from the distance unit 10 and applied to terminal 37 of the speed unit will result in positive pulses of uniform width for application to the input of the units counter at terminal 213. Alternatively, the speed unit 30 receives positive overflow pulses from the distance unit 10, which are applied to terminal 38 of the speed unit, and to terminal 213 of the units counter.

The logic circuits of the speed unit 30, which comprise gates 201–206 and 230–233, perform five basic functions. These functions are:

A. To shape the distance pulses so that the pulses can be counted during a predetermined time period, thus permitting the measurement of speed of the vehicle.

B. To transfer the count contained in counters 213 to latch circuits 213.

C. To hold the count in latch circuits 212 during the period when the count is not being transferred from counters 213.

D. To blank the 7-segment displays 31 by application of a signal to the decoder/drivers 221–223 during the period when the count is being transferred from counters 213 to latch circuits 212.

E. To reset counters 213 after the count has been transferred out of the counters.

The first function of gating the distance pulses on during a predetermined time period of accomplished by application of a pulse of a known duration from time base 40 to a terminal 41 of the speed unit 30. A terminal 42, which is connected to a gate 230 is normally held at a logic zero when the brake energized signal is not applied. The combination of the logic zero at terminal 42 and the logic 1 obtained from time base 40 at terminal 41 produces a logic zero at an input terminal 234 of a gate 203.

The application of a logic zero from gate 230 to input terminal 234 of gate 203, in conjunction with the logic zero on a terminal 235 which is obtained from an output terminal 238 of a gate 204, results in a logic 1 being produced by the gate 203 which is then applied to terminal 236 of gate 204. Further, the application of this logic 1 to terminal 236 in conjunction with the logic zero at terminal 237 produces a logic zero at output terminal 238. Continuing with this chain of logic, the logic zero at terminal 238 is applied through switch 39b to input terminals 239 of gate 231 which inverts the logic zero to a logic 1. Thus, at output terminal 240 of gate 231 and therefore input terminal 241 of gate 232, a logic 1 is produced. From that logic 1, a logic zero is produced by the inverting function of gate 232 and is then applied via path 218 to the latch circuits 214–216. A logic zero does not cause the count held in counters 213 to be transferred to the latch circuits 212 and therefore the display remains as it is. A function of the two inverting gates 231 and 232 is to raise the logic signals to sufficient power to drive the latch circuits.

Upon energization of the vehicle brakes, a logic 1 signal is applied to terminal 42 which is connected to gate 230. This reverses the state of gates 230, 203, 204, 231, and 232, thus producing a logic one at the output of gate 232. The logic 1 at the output of gate 232 is applied via path 218 to latch circuits 212 and results in the transfer of the count held in the three counters 213 via paths 210 to the latch circuits 212. At that instant of time, whatever count is contained in the counters is transferred to the latch circuits 212. The logic one signal which causes the transfer of the count is of short duration, however, and is determined by the capacitor 242 and resistors 243a and 243b at the input of gate 204.

The same logic one on path 218 which causes the transfer of the count to latch circuits 212 also blanks the seven segment displays 31 during the duration of the logic 1 pulse. The blanking is caused by the application of the logic 1 pulse generated at the output of gate 232 and conducted on path 218 and 219, 220 and switch 39a to terminals 221–223 of the decoder/drivers. The decoder/drivers 221–223 blank the three segment displays 31.

The latch circuits 212 hold the count when the count is not being transferred from counter units 213 to latches 212. A logic 1 signal formed at the output terminal 238 of gate 204 exists during the same period of time as the logic 1 on path 218, is applied to the input of gate 233 via switch 39b, path 250, and switch 34. Gates 233, 205, and 206 generate another logic one signal at output terminal 254 of gate 206. This logic 1 pulse, which is also of short duration, is generated after the completion of the logic 1 signal at the output of gate 232. In effect gates 205 and 206, in combination with the time constant formed by capacitor 259 and resistors 260a and 260b, function to generate a new logic 1 signal at the trailing edge of the transfer logic 1 signal applied at terminal 238. This new logic 1 signal, termed the reset signal, is applied from terminal 254 of gate 206 via path 255 to terminals 256–258 of the reset terminals of the hundreds, tens and units counters, respectively. Thus counters 213 are reset after the count has been transferred from the counters to the latch circuits.

It will be noted that, with switch 39a in the b position, the blanking signal on path 220 is grounded thus preventing the seven segment displays 31 from being blanked. With the second section of the switch, 39b, in the c position input terminal 239 of gate 231 is connected to a source of positive potential via path 261. The positive voltage at the input terminal 239 of gate 231 then produces a continuous logic one at the output of gate 232 on path 218 which is applied to the transfer terminals 214–216 of latch circuits 212 thus maintaining them continuously in the transfer mode. In this mode, the output from the counter circuits is continuously transferred via the latch circuits 212 to the decoder/drivers 221–223 as counters 213 continue to count.

In operation, the circuits of the speed unit 30 count the distance pulses applied to terminal 37 during a finite period of time determined by the pulse applied to terminal 41. The application of a brake energized signal to terminal 42 causes the counters to count the number of distance pulses during the predetermined time interval and to transfer the count to circuits 212 and from there to the seven segment displays 31. Thus, in accordance with the equation speed equals distance divided by time, the number displayed is equal to the speed of the vehicle.

Summary of Operation of the Apparatus of FIG. 1

The operation of the apparatus A of FIG. 1 to measure the total stopping distance of the vehicle has been described above.

Apparatus A alternatively measures the speed and distance to determine the stopping coefficient of friction. At the instant brake pedal 60 is depressed, an electrical signal is sent via conductor 63 to terminal 21 of the distance unit 10, causing that unit to start to count the pulses from the distance measuring assembly 13. At the same time, the signal supplied via conductor 63 instructs the speed measuring unit 30, by way of the brake energize signal applied to terminal 42, to hold the displayed velocity of the vehicle as measured at the time the brake pedal is depressed. The distance unit 10 will then continue to count pulses as long as the vehicle moves and the wheel 51 in the distance measuring assembly 13 continues to supply pulses proportional to the distance travelled. Thus, the speed of the vehicle at the time of brake engagement is displayed on speed unit 30 and the distance travelled by the vehicle after brake engagement is displayed on distance unit 10. From the speed and distance values displayed, the stopping coefficient of friction may be determined.

Further, apparatus A alternatively measures the speed and distance to determine the skidding coefficient of friction.

Pulses proportional to distance which are obtained from the distance measuring assembly 13 are applied to terminal 14 of the distance unit 10 and via path 36 to terminal 37 of speed unit 30. The speed unit 30 then counts the number of distance pulses which occur during the time interval determined by the time base 40, connected to terminal 41 of the speed unit. The speed unit 30 displays the velocity based on these time and distance signals when brake pedal 60 is depressed and a signal is applied to terminal 42 of the speed unit. At this instant of time, the speed of the vehicle, which has been presented in the display 31, is held for later recording.

By means of the same brake energize signal, which is also applied to terminal 21 of distance unit 10, counters 130–133 contained therein are instructed to start counting the distance pulses from the distance measuring assembly 13. However, for the skidding coefficient measurements, a locked wheel signal applied to distance unit 10 at terminal 22, causes counters 130–133 to reset to zero. This resetting process continues as long as the wheel 64 continues to rotate and produce pulses by the action of magnets 67 in cooperation with switch 69. When wheel 64 is fully locked, however, the pulses supplied via conductor 70 cease, and resetting of the counters of the distance unit 10 therefore ceases. The counters, at this point, accumulate a count of the distance pulses received at terminal 14. When the vehicle comes to a full stop and the distance measuring wheel 51 no longer rotates, pulses are no longer supplied by switch 55, and counters 130–133 stop counting. With the vehicle stopped, the number displayed in the speed unit 30 represents the forward speed of the vehicle at the instant the brakes were applied while the number in the display of the distance unit 10 represents the distance travelled by the test vehicle from the time braked wheel 64 locked until the vehicle stops. From this data, representing the skidding distance measurement, the coefficient of friction of the roadway surface in conjunction with the tire surface of the vehicle may be calculated.

Apparatus for Determining the Coefficient of Friction as a Function of Percent Slip The coefficient of friction between a tire and a road surface also varies according to the amount the tire slips on the road surface. The percent slip is defined by the formula:

$$\% \text{ Slip} = \frac{D_r - D_t}{D_r} \times 100$$

In this formula $D_r$ equals the distance travelled by the vehicle along the road surface from the point at which braking force is first applied to at least one of the wheels of the vehicle to the point at which the vehicle comes to a complete stop, and $D_t$ equals the horizontal distance of rotation of the braked wheel while the vehicle travels the distance $D_r$ along the roadway surface.

The quantity $D_t$ is additionally known to be:

$$D_t = n\pi d$$

where $n$ is the number of rotations of the wheel being braked, and $d$ is the diameter of the braked wheel and tire unit. The quantity $D_t$ is thus represents the horizontal distance the braked wheel and tire unit would roll along the road surface if the tire were not slipping on the road surface. When the braked wheel is fully locked the distance $D_t$ is zero and there is 100% slip. When the tire of the braked wheel is not slipping on the road surface the distance $D_t$ equals the distance $D_r$ and there is a zero percent slip.

A graph G (FIG. 8) shows the values of coefficient of friction $\mu$ as a function of the percent slip known as $\mu$-slip curve. As can be seen from graph G, the maximum coefficient of friction does not occur when the braked wheel is fully locked and there is a 100% slip. Rather, the maximum coefficient of friction occurs at a point 300 on the $\mu$-slip curve. This point of maximum coefficient of friction is termed the point of critical slip. Although the value of the point of critical slip varies somewhat according to the road surface and the tire being used, it may be generally stated that the point of critical slip, and hence the maximum coefficient of friction, occurs at percent slip values of between 12 and 20.

Figure 8:
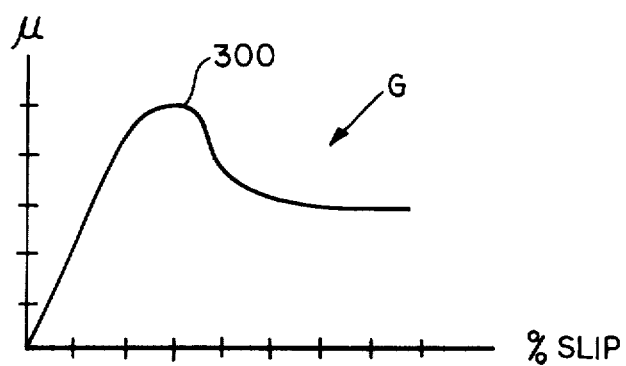
FIG. 8 is a graph showing the variation in coefficient of friction as a function of the percent slip.

The ability to determine the coefficient of friction as a function of the percent slip permits a detailed evaluation of the frictional characteristics of a road. The present invention provides means for measuring speed and distance in testing so that a graph such as is shown in FIG. 8 can be derived, giving an over view of the frictional characteristics of the road under a wide variety of braking conditions which are likely to occur during normal use of the road. Further, a graph so derived gives a clear picture of the maximum value of the coefficient of friction as well as the range of values of percent slip over which the road exhibits acceptable friction characteristics.

Figure 7:
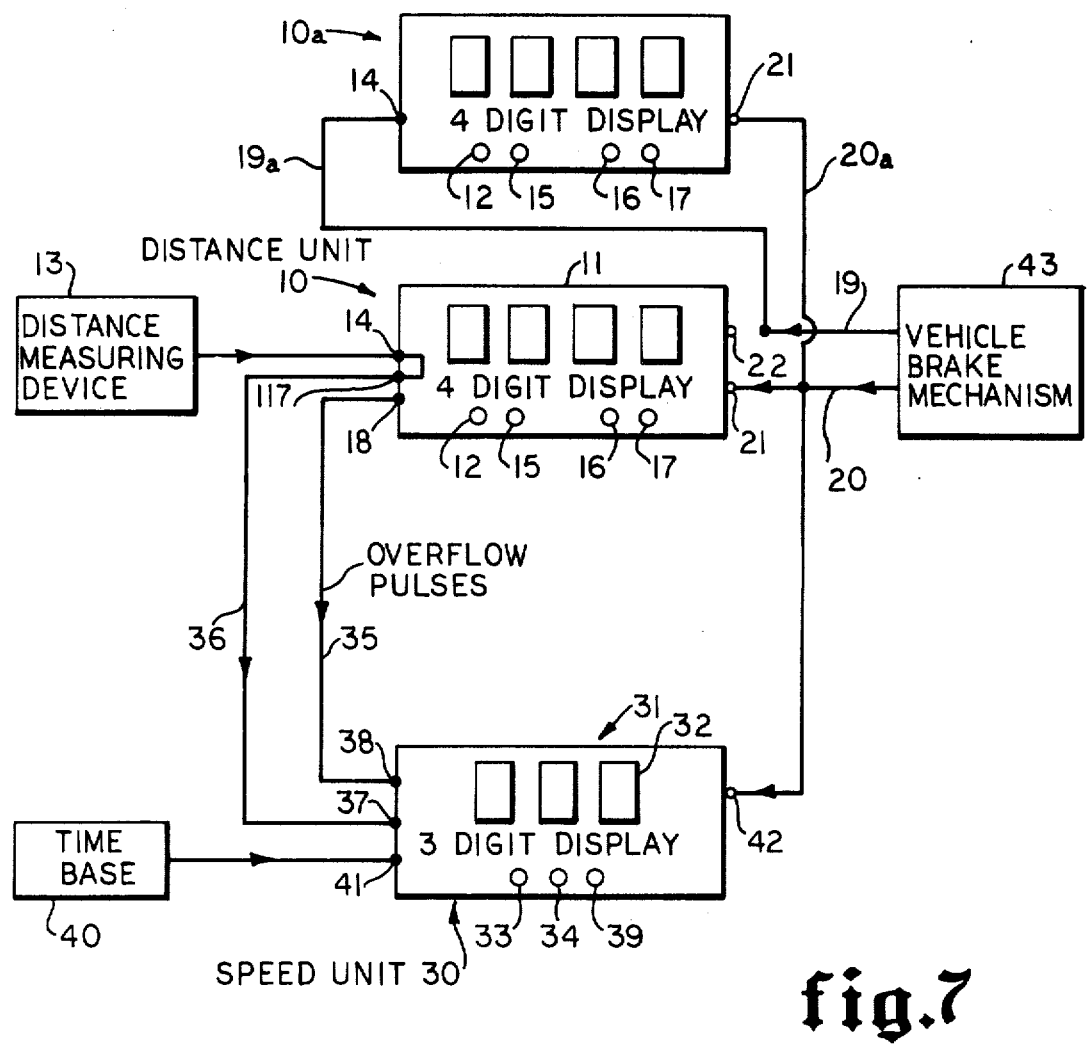
FIG. 7 is a block diagram illustrating apparatus for determining the coefficient of friction as a function of percent slip.

FIG. 7 illustrates an apparatus according the second embodiment of the present invention for measuring speed and distance to determine the percent slip and the coefficient of friction corresponding to that percent slip. Distance unit $10_a$ measures and displays $D_t$, the horizontal distance of rotation of the braked wheel 64. Distance unit 10, on the other hand, measures and displays $D_r$, the distance travelled by the vehicle from the time of brake engagement until the vehicle comes to rest. From the values of $D_r$ and $D_t$, the average percent slip may be determined using the formula set forth above. In addition, speed unit 30 measures and displays the speed of the vehicle at the time of brake engagement. The magnitude of the coefficient of friction corresponding to the percent slip may then be determined according to the formula $$\mu = \frac{S}{KD_t}.$$

Distance units 10 and $10_a$ (FIG. 7) both employ the like circuitry to that shown in FIG. 5 for the distance unit 10 except that switch 69 (FIG. 4) of vehicle brake mechanism 43 is electrically connected in the circuit of distance unit $10_a$ to replace switch 55 shown in FIG. 5. Because of the replacement of switch 55 with switch 69, distance unit $10_a$ counts the pulses of the wheel locked signal from vehicle brake mechanism 43 in distance unit $10_a$. Because of the substantial similarity in the circuitry of the distance unit 10 and $10_a$ of FIG. 7 and the distance unit 10 of FIG. 1, like reference numerals identify corresponding elements of the distance units, and the foregoing detailed description of distance unit 10 (FIG. 5) is applicable to distance units 10 and $10_a$ of FIG. 7. Similarly the previous detailed descriptions of distance measuring device 13, vehicle brake mechanism 43, time based 40, and speed unit 30 are applicable to the corresponding elements shown in FIG. 7.

Distance unit $10_a$ measures the horizontal distance of rotation of the braked wheel 64 by counting the number of pulses of wheel locked signal which occur subsequent to the engagement of the brakes. The wheel locked signal is supplied to terminal 14 of distance unit $10_a$ by a conductor 19a. When switch 69 closes and a pulse appears at terminal 14, transistor 101 conducts and causes a logic 1 to be applied at input 123 of Nor gate 102. This causes the output of gate 102 and the input 108 of Nor gate 103 to be a logic zero. The brakes energized signal is supplied to terminal 21 of distance unit 10 by conductor $20_a$. When the brakes are engaged and the brakes energized signal initiated, a positive potential appears at terminal 21 and causes transistor 104 to conduct. The conduction of transistor 104 results in a logic zero being applied to input 106 of gate 103. Thus the application of a pulse at terminal 14 subsequent to the initiation of the brake energize signal 20 causes both input 106 and 108 of Nor gate 103 to be logic zeros. Gate 103 then produces a logic 1 output which is applied to the unit counter 130; however, a pulse applied at terminal 14 is not counted before the brakes energize signal has been initiated because unless transistor 104 conducts, a logic 1 appears at input 106 of gate 103 by virtue of the voltage source the Vcc connected to resistor 122. A logic 1 applied to input 106 of gate 103 produces a logic zero at the output 107 of gate 103.

The count registered by distance unit $10_a$ represents the horizontal distance of rotation of braked wheel 64. Since the diameter of the wheel and tire are known the number of magnets 67 which are equally spaced about the circumference of hub 68 of wheel 64 are chosen to provide a convenient calibration of pulses per unit distance. Accordingly, the count registered and displayed by distance 10 will also represent pulses per unit distance.

Distance unit 10 responds to closing of the switch 55 and functions in a similar manner except that the pulses applied to terminal 14 of distance unit 10 are proportional to the distance travelled by the vehicle. Switch 55 provides a pulsed signal from the fifth wheel apparatus 51 shown in FIG. 2. Since the diameter, and therefore the circumference, of wheel 51 is known the number of magnets 56 located on hub 54 of wheel 51 are chosen to provide a convenient calibration of pulses per unit distance travelled by the vehicle. Distance unit 10 will count the number of such pulses applied to terminal 14 subsequent to the initiation of the brakes energized signal which is supplied to terminal 21 of the distance unit 10 by conductor 20. Thus the count displayed on the display 11 of distance 10 will represent the distance travelled by the vehicle subsequent to brake engagement.

It should also be noted that the wheel locked signal is not applied to terminal 22 of either distance unit 10 or distance unit $10_a$. It is both unnecessary and undersirable to reset the counters 130 of distance units 10 and $10_a$ until the time that the braked vehicle wheel 64 is locked. The apparatus shown in FIG. 7 yields valuable data concerning the coefficient of friction whether or not the braked vehicle wheel becomes fully locked.

Distance unit $10_a$ measures and displays the horizontal distance of rotation of the braked wheel 64 subsequent to brake engagement, and distance unit 10 measures and displays the distance travelled by the vehicle subsequent to brake engagement. The distances displayed by the two units may then be used to calculate the percent slip of the braked wheel and tire unit along the road surface. In addition, the distance displayed on distance unit 10 may be used with the velocity displayed on speed unit 30 to calculate the coefficient of friction which corresponds to that value of percent slip.

The foregoing disclosures and descriptions of the invention are illustrative and explanatory thereof, and varies changes in the size, shape and materials as well as in the details of the illustrated construction may be made without departing from the spirit of the invention.

We claim:

1. An apparatus for measuring speed and distance in testing to determine the skidding coefficient of friction between a road surface and a tire of a vehicle wheel to which a braking force is applied causing the wheel to lock, comprising:

speed measuring means for measuring the speed of said vehicle at the time a braking force is applied to the vehicle wheel; and distance measuring means operably connected to said speed measuring means for measuring the distance travelled by said vehicle after said wheel has locked, whereby the vehicle speed at the time of braking and the distance travelled by said vehicle from the time said vehicle wheel locks until the vehicle comes to rest are determined.

2. The apparatus set forth in claim 1, wherein said speed measuring means includes:

vehicle distance signal generating means for generating a vehicle distance signal having pulses proportional in number to the distance travelled by said vehicle;

time signal generating means for generating a time signal having periodic pulses of a constant time duration;

brake engagement signal generating means for generating a brake engagement signal of a substantially constant magnitude initiated at the time the braking force is applied to said vehicle wheel; and speed counting means for counting the number of pulses of said vehicle distance signal occuring during the duration of a pulse of said time signal and upon initiation of said brake engagement signal, whereby said speed counting means counts pulses proportional to the distance travelled by said vehicle within a known time period upon application of said braking force.

3. The apparatus set forth in claim 2, wherein said vehicle distance signal generating means includes:

a rotating member of a known diameter mounted with said vehicle and operatively engaging said raod; and signal producing means for producing a signal having pulses proportional to the rotation of said rotating member, whereby said signal producing means produces a signal having pulses proportional to the distance travelled by said vehicle.

4. The apparatus set forth in claim 3 wherein said signal producing means includes:

a magnet mounted with said rotating member and spaced from the center thereof;

magnetically actuated switching means operatively connected to a voltage source and to said speed counting means for temporarily closing and allowing a pulse to pass to said speed counting means, and said switching means being mounted in a fixed position relative to said rotating member and spaced from the center thereof a distance substantially equal to that of said magnet, whereby rotation of said magnet with said rotating member causes said magnet to come into close proximity with and actuate said switching means to allow a pulse to pass to said speed counting means.

5. The apparatus set forth in claim 1, wherein said speed measuring means includes:

display means for displaying the speed of said vehicle at the time said braking force is applied.

6. The apparatus set forth in claim 1, wherein said distance measuring means includes:

vehicle distance signal generating means for generating a vehicle distance signal having pulses proportional in number to the distance travelled by said vehicle;

braked wheel signal generating means for generating a braked wheel signal having pulses proportional in number to the rotational movement of said vehicle wheel to which said braking force is applied;

distance counter means for counting the pulses of said vehicle distance signal; and distance counter reset means operatively connecting said distance counter means and said braked wheel signal generating means for resetting the count of said distance counter means to zero when a pulse is received from said braked wheel signal generating means, whereby said distance counter means counts the pulses of said vehicle distance signal after said braked wheel stops rotating.

7. The apparatus set forth in claim 6, wherein said braked wheel signal generating means includes:

a magnet mounted with said braked wheel and spaced from the center thereof;

magnetically actuated switching means operatively connected to a voltage source and to said distance counter means for temporarily closing and allowing a pulse to pass to said distance counter means; and said switching means being mounted in a fixed position relative to said braked wheel and spaced from the center thereof a distance substantially equal to that of said magnet whereby rotation of said magnet with said braked wheel causes said magnet to come into close proximity with and actuate said switching means to allow a pulse to pass to said distance counting means.

8. The apparatus set forth in claim 1, wherein said distance measuring means includes:

display means for displaying the distance travelled by said vehicle after said braked wheel has locked.

9. An apparatus for measuring speed and distance in testing to determine the coefficient of friction as a function of the amount of slip between a road surface and a tire of a vehicle wheel to which a braking force is applied, comprising:

speed measuring means for measuring the speed of said vehicle at the time the braking force is applied to the vehicle wheel;

first distance measuring means operably connected to said speed measuring means for measuring the distance travelled by said vehicle after said braking force is applied to said wheel; and second distance measuring means operably connected to said speed measuring means for measuring the horizontal distance of rotation of the braked wheel for all amounts of slip of said tire on said road surface, whereby the speed of said vehicle at the time of braking and the distance travelled by said vehicle after braking are obtained and the horizontal distance of rotation of said braked wheel are determined for calculating the percent slip of said braked wheel on the road surface.

10. The apparatus set forth in claim 9, wherein said first distance measuring means includes:

vehicle distance signal generating means for generating a vehicle distance signal having pulses proportional in number to the distance travelled by said vehicle;

brake engagement signal generating means for generating a brake engagement signal of a substantially constant magnitude initiated at the time said braking force is applied to said vehicle wheel; and vehicle distance counting means for counting the number of pulses of said vehicle distance signal after initiation of said brake engagement signal, whereby said vehicle distance counting means counts pulses proportional to the distance travelled by said vehicle after application of said braking force.

11. The apparatus set forth in claim 9, wherein said second distance measuring means includes:

braked wheel distance signal generating means for generating a braked wheel signal having pulses proportional in number to the horizontal distance of rotation of said braked wheel;

brake engagement signal generating means for generating a brake engagement signal of a substantially constant magnitude initiated at the time said braking force applied to said vehicle wheel; and braked wheel distance counting distance means for counting the number of pulses of said braked wheel distance signal after initiation of said brake engagement signal, whereby said braked wheel distance counting means counts pulses proportional to the horizontal distance of rotation of said braked wheel after application of said braking force.

12. An apparatus for measuring speed and distance in testing to determine the stopping distance coefficient of friction and the skidding distance coefficient of friction between a road surface and a tire of a vehicle wheel to which a braking force is applied, comprising:

speed measuring means for measuring the speed of said vehicle at the time the braking force is applied to the vehicle wheel; and distance measuring means operably connected to said speed measuring means for alternatively measuring the distance travelled by said vehicle after said braking force is applied and the distance travelled by said vehicle after said vehicle wheel locks, whereby when said distance measuring means measures the distance travelled by said vehicle after application of said braking force the values of speed and distance for calculating the stopping distance coefficient of friction are determined and when said distance measuring means measures the distance travelled by said vehicle after said wheel locks the speed and distance for calculating the skidding distance coefficient of friction are determined.

13. A method of measuring speed and distance in testing to determine the skidding distance coefficient of friction between a road surface and a tire of a wheeled vehicle comprising:

applying a braking force to a wheel of a vehicle while said vehicle is moving to cause said wheel to lock at a time subsequent to said application of the braking force;

measuring the speed of said vehicle at the time said braking force is applied; and measuring the distance travelled by said vehicle after said wheel locks, whereby the vehicle speed at the time of braking and the distance travelled by said vehicle from the time said vehicle wheel locks until said vehicle comes to rest are determined.

14. A method of measuring speed and distance in testing to determine the coefficient of friction between a road surface and a tire of a vehicle wheel as a function of the slippage of the wheel on the road surface, comprising:

applying a braking force to a wheel of a vehicle while said vehicle is in motion;

measuring the speed of said vehicle at the time said braking force is applied;

measuring the distance travelled by said vehicle after said braking force is applied; and measuring the horizontal distance of rotation of the braked wheel, whereby the speed of said vehicle at the time of braking and the distance travelled by said vehicle after braking are obtained and the distances for calculating the percent slip of said vehicle wheel on the road surface are determined.

* * * * *